W. H. JAEGER.
HEDGE TRIMMER.
APPLICATION FILED OCT. 28, 1916.

1,285,203.

Patented Nov. 19, 1918.

Inventor
W. H. JAEGER
By Watson E. Coleman
Attorney

UNITED STATES PATENT OFFICE.

WILLIAM HOLLINGSWORTH JAEGER, OF TRENTON, NEW JERSEY.

HEDGE-TRIMMER.

1,285,203.   Specification of Letters Patent.   Patented Nov. 19, 1918.

Application filed October 28, 1916. Serial No. 128,284.

*To all whom it may concern:*

Be it known that I, WILLIAM H. JAEGER, a citizen of the United States, residing at Trenton, in the county of Mercer and State of New Jersey, have invented certain new and useful Improvements in Hedge-Trimmers, of which the following is a specification, reference being had to the accompanying drawings.

This invention relates to an improved hedge trimmer and has for its primary object to provide a device of this character for easily and accurately cutting or trimming a lawn hedge and collecting the cut foliage.

It is another important object of the invention to provide a device for the above purpose including a reciprocating toothed cutting blade operating in conjunction with a relatively stationary, toothed blade, a slotted bar disposed above the reciprocating blade and guide bolts for said blade connecting said bar to the stationary blade, operating means for the reciprocating blade, and means for preventing the accumulation of the trimmings between the bar and the movable cutting blade.

It is a further general object of my invention to improve and simplify the construction of devices of the above character, whereby the same are rendered easy of operation, strong and durable, and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a plan view of a hedge trimmer constructed in accordance with the preferred embodiment of my invention;

Figure 1:
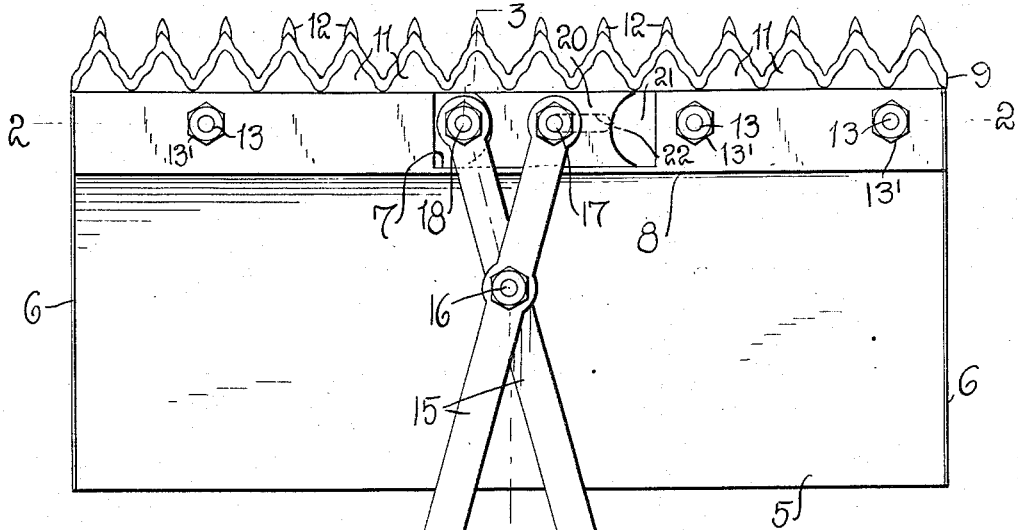
Figure 2:
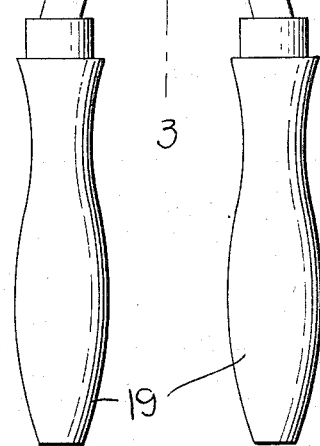
Fig. 2 is a longitudinal section taken on the line 2—2 of Fig. 1.
Figure 3:
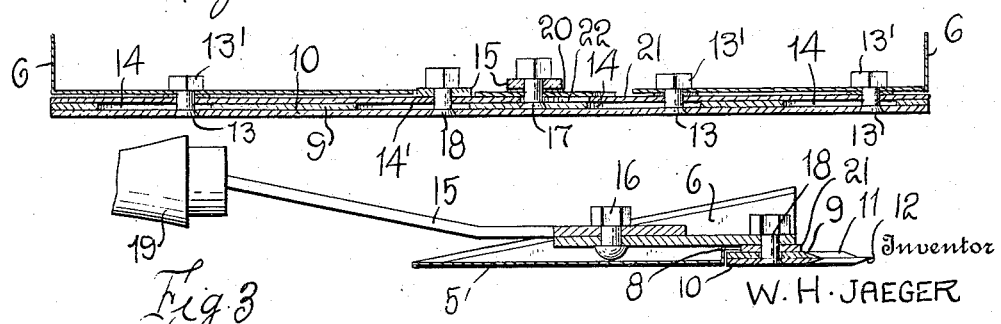
Fig. 3 is a section taken on the line 3—3 of Fig. 1.

Referring in detail to the drawing, 5 designates the bottom of the sheet metal pan, the opposite ends of which are provided with upstanding flanges 6 having their upper edges obliquely inclined downwardly from the front to the rear longitudinal edge of the pan. The front edge portion of the pan, at the center thereof, is cut away or longitudinally recessed, as shown at 7, and the remaining front edge portions of said pan are upwardly offset, as at 8, or disposed above the plane of the bottom wall 5.

9 designates the top or uppermost shearing or cutting blade which is mounted for reciprocating movement in the manner to be presently stated, and 10 indicates the relatively stationary bottom cutting blade. Each of these blades is formed with a series of triangular-shaped teeth 11 and 12 respectively, said teeth having corrugated cutting edges, as clearly shown in Fig. 1. The teeth 12 of the lower cutting blade 10 are of somewhat greater length than the teeth 11 of the upper blade so that the points of the teeth 12 will project for some distance forwardly of the points of the teeth 11.

The blades 9 and 10 are arranged in superposed relation beneath the outwardly offset portions 8 of the pan 5, and between the upper reciprocating blade 9 and the edge portions 8 of the pan, a metal bar 21 is disposed, said bar extending across the recess 7 and being of a length substantially coextensive with the length of the pan. This bar 21 and the lower cutting blade 10 are held in relatively stationary positions by means of one or more bolts 13 which are preferably permanently fixed at one of their ends in the blade 10 and extend through coinciding openings in the bar 21 and the portions 8 of the pan. Suitable retaining nuts 13' are threaded upon the upper ends of said bolts. The reciprocating cutting blade 9 is provided with spaced, longitudinally extending slots 14 through which the respective bolts 13 extend.

Intersecting levers 15 extend over the pan 5 and, at their point of intersection, are connected together by a pivot bolt 16. The end of one of these levers is pivotally connected by means of the bolts 17 to the reciprocating cutting blade 9, and the corresponding end of the other lever is similarly connected to a bolt 18 fixed in the lower blade 10 and extending through a slot 14' in the movable blade 9. The bolt 17 is longitudinally movable in a slot 22 provided in the stationary bar 21 and a plate 20, engaged upon the bolt 17 beneath the end of the lever 15, slides upon the bar 21 over the slot 22 and closes the same.

To the other ends of the levers 15, suitable hand grips 19 are secured. As shown in Fig. 1, the levers 15, rearwardly of the pivot bolts 16, are upwardly inclined so that the hand grips 19 will be disposed in position for their free manipulation without liability of the hand engaging the top branches of the hedge.

From the above description, taken in connection with the accompanying drawing, the construction and manner of operation of my improved hedge trimmer may be readily understood. As the hand grips 19 are moved toward and from each other, the cutting blade 9 is reciprocated between the blade 10 and the bar 21, and in this reciprocating movement of the blade 9 the corrugated cutting edges of the teeth 11 and 12 will cut or trim off the top branches and leaves of the hedge as the trimmer is moved over the same. By the provision of the plate 20, the slot 22 is entirely covered so that the trimmings cannot enter the same and work between the bar 21 and the reciprocating cutting blade and thus interfere with the action of the latter. The branches and leaves are collected upon the pan 5 so that they will not interfere with the action of the cutting teeth or remain upon the top of the hedge so as to necessitate the lifting of the trimmer in order to avoid the obstruction, which would result in a ragged or uneven surface. At frequent intervals, the trimmings may be dumped from the pan into a suitable receptacle.

The lower teeth 12 being extended beyond the upper teeth, act as guides and also serve to insure a continuous cutting action throughout the length of the teeth.

I have above disclosed a particular form and construction of the collecting pan, but this pan, as well as the other detail parts of the device, are susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:—

1. In a hedge trimmer, a collecting pan, the bottom wall of said pan at its forward edge being angularly offset and disposed in parallel relation to said wall, a cutting member fixed to said offset edge of the pan, a reciprocating cutting member mounted in superposed relation to said fixed member, and manually operable means for actuating said reciprocating cutting member.

2. In a hedge trimmer, a pair of cutting blades arranged in superposed relation, one of said blades being reciprocatable relative to the other, and a pair of pivotally connected operating levers, one of said levers having a movable pivotal connection to the latter cutting blade whereby the same is reciprocated, and the other of said levers having a relatively stationary pivotal connection to the other of the cutting blades.

3. In a hedge trimmer, a collecting pan having its forward longitudinal edge upwardly offset, superposed cutting blades arranged beneath the offset edge of the pan, means connecting the lower cutting blades to the pan and holding the same in a stationary position relative thereto, a bar secured by the latter means between the other of the blades and the offset edge of the pan, intersecting pivotally connected operating levers, said bar having a longitudinal slot therein, a bolt fixed in the latter cutting blade extending through said slot to which one of the levers is pivotally connected, and a relatively stationary, pivotal connection between the other of the levers and the first named cutting blade.

4. In a hedge trimmer, a collecting pan having its forward longitudinal edge upwardly offset, superposed cutting blades pivotally mounted beneath the offset edge of the pan, the upper blade having spaced slots therein, bolts rigidly securing the lower blade upon the pan and extending through said slots, a longitudinal bar extending over the slots in the upper blade, said bar being also provided with a slot, a bolt fixed to the upper blade and extending through the slot in the bar, intersecting pivotally connected levers extending over the collecting pan, one of said levers being pivotally connected to said bolt, and a relatively stationary pivot to which the other of the levers is connected.

5. In a hedge trimmer, a collecting pan having its forward longitudinal edge upwardly offset, superposed cutting blades pivotally mounted beneath the offset edge of the pan, the upper blade having spaced slots therein, bolts rigidly securing the lower blade upon the pan and extending through said slots, a longitudinal bar extending over the slots in the upper blade, said bar being also provided with a slot, a bolt fixed to the upper blade and extending through the slot in the bar, a plate engaged upon said bolt and covering the slot in said bar, said upper cutting blade having an additional slot therein, a bolt fixed in the lower stationary blade and projecting through said slot and through an opening in said bar, and intersecting pivotally connected levers extending over the collecting pan and operatively connected respectively to said bolts.

In testimony whereof I hereunto affix my signature in the presence of two witnesses.

WILLIAM HOLLINGSWORTH JAEGER.

Witnesses:
GEORGE W. JAGGERS, Jr.,
W. C. ROCKHILL HART.